United States Patent [19]

Kocher et al.

[11] 4,386,394
[45] May 31, 1983

[54] SINGLE PHASE AND THREE PHASE AC TO DC CONVERTERS

[75] Inventors: Mark J. Kocher, Scotch Plains, N.J.; Robert L. Steigerwald, Scotia, N.Y.

[73] Assignee: General Electric Company, Schenectady, N.Y.

[21] Appl. No.: 264,750

[22] Filed: May 20, 1981

[51] Int. Cl.³ .................... H02M 1/12; H02M 7/23
[52] U.S. Cl. ................................. 363/20; 363/41; 363/67; 363/71
[58] Field of Search .............. 323/268, 272; 363/3, 363/6, 20, 21, 39–41, 44–46, 71, 48, 87, 123, 125, 127, 129, 67–70, 89

[56] References Cited

U.S. PATENT DOCUMENTS

| | | | |
|---|---|---|---|
| 3,728,609 | 4/1973 | Kelley | 363/48 |
| 3,825,814 | 7/1974 | Pelly | 363/41 X |
| 3,883,792 | 5/1975 | Ellert | 363/39 |

OTHER PUBLICATIONS

Thomas, "AC to DC Converter", IBM Technical Disclosure Bulletin, vol. 6, No. 3, Aug. 1963, p. 45.

Primary Examiner—A. D. Pellinen
Attorney, Agent, or Firm—William H. Steinberg; James C. Davis, Jr.; Marvin Snyder

[57] ABSTRACT

A single phase AC to DC power converter is provided which accepts a single AC line input voltage and provides a DC output voltage. Input current feedback is used to control the converter and to provide high quality sinusoidal line currents in phase with the applied line voltage. In another embodiment, a three phase AC to DC converter is realized as a delta connection of three isolated single phase AC to DC converters. Reduction in peak transistor currents of the switching transistor in each single phase converter is accomplished by the introduction of third harmonics to each of the single phase AC to DC power converters. Each of the three single phase AC to DC converters are synchronized so that the current pulses at the outputs of the three AC to DC converters are staggered in time reducing the amount of filtering required at the load.

12 Claims, 2 Drawing Figures

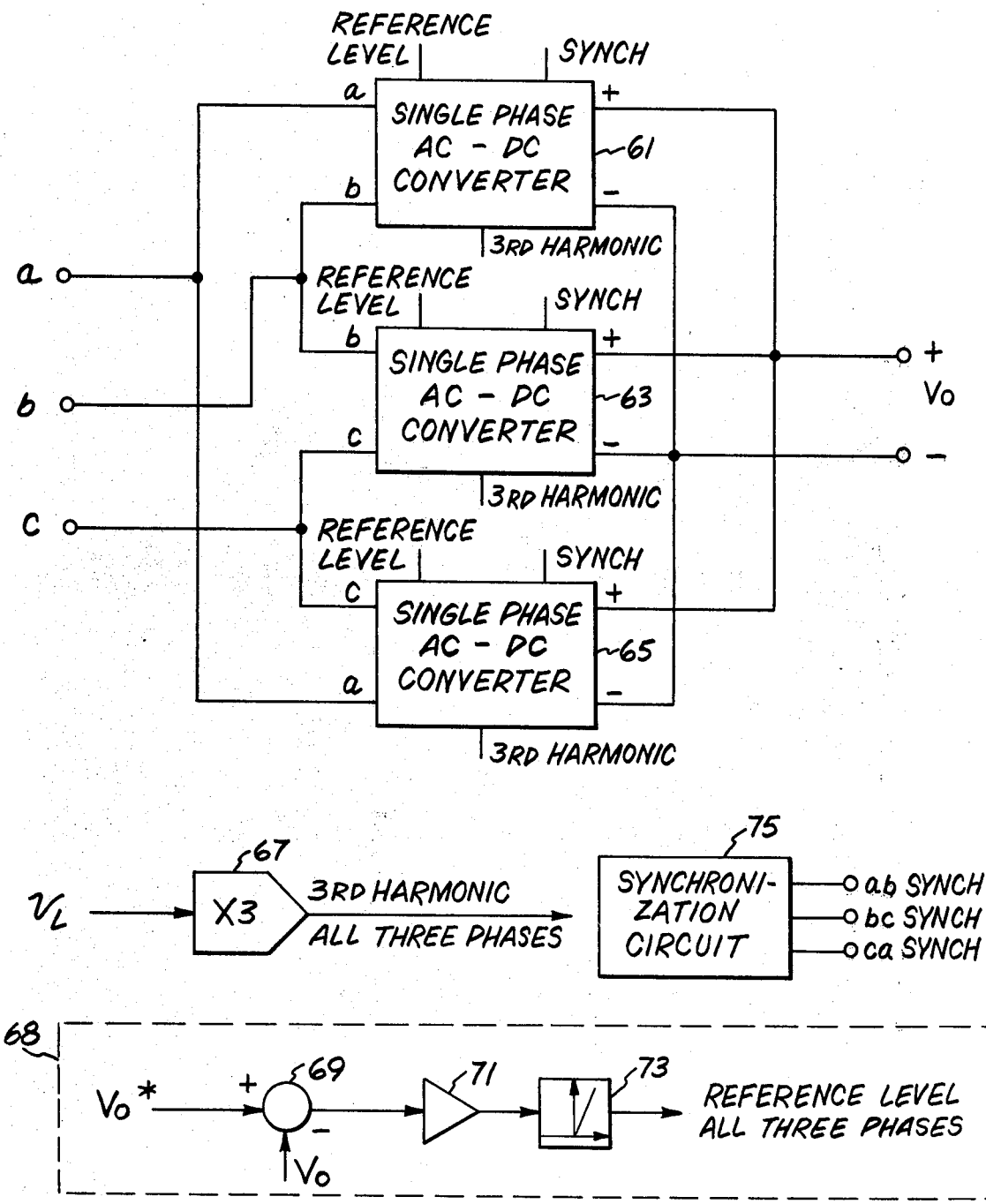

SINGLE PHASE AND THREE PHASE AC TO DC CONVERTERS

BACKGROUND OF THE INVENTION

This invention relates to single phase and three phase AC to DC power converters using active control of the input current waveform to draw high quality sinusoidal line currents in phase with the applied line voltages.

Conventional power converters (phase-controlled rectifiers) accepting AC line input voltage and providing a DC output voltage introduce harmonic and reactive currents into the power generation and delivery system. Harmonic and reactive currents do not contribute power to the load, and therefore serve only to cause interference in power and communication systems and generally increase the ratings of the power generation and delivery equipment required for a given amount of power. As the use of electric vehicle battery chargers, adjustable speed AC heat pump drives and adjustable speed appliance drives increases, minimization of harmonics and reactive current becomes particularly important. In mobile power systems such as airborne or space craft power supplies, it is also important to reduce harmonics and reactive currents to minimize the required kVA ratings and therefore the weight of generators.

It is an object of the present invention to provide a single phase and a three phase AC to DC power converter which draw high quality sinusoidal line currents which are in phase with the applied line voltages.

BRIEF SUMMARY OF THE INVENTION

In one embodiment, a single phase AC to DC power converter is provided which accepts a single AC line input voltage and provides a DC output voltage. Input current feedback is used to control the converter and to provide high quality sinusoidal line currents in phase with the applied line voltage.

In another embodiment, a three phase AC to DC converter is realized as a delta connection of three isolated single phase AC to DC converters. Reduction in peak transistor currents of the switching transistor in each single phase converter is accomplished by the introduction of third harmonics to each of the single phase AC to DC power converters. Each of the three single phase AC to DC converters are synchronized so that the high frequency current pulses at the outputs of the three AC to DC converter are staggered in time reducing the amount of filtering required at the load.

BRIEF DESCRIPTION OF THE DRAWING

The features of the invention believed to be novel are set forth with particularity in the appended claims. The invention itself, however, both as to organization and method of operation together with further objects and advantages thereof, may best be understood with reference to the following description taken in conjunction with the accompanying drawing in which:

FIG. 2 is a block diagram representation of a three phase AC to DC power converter of the present invention.

DETAILED DESCRIPTION OF THE DRAWING

Figure 1:
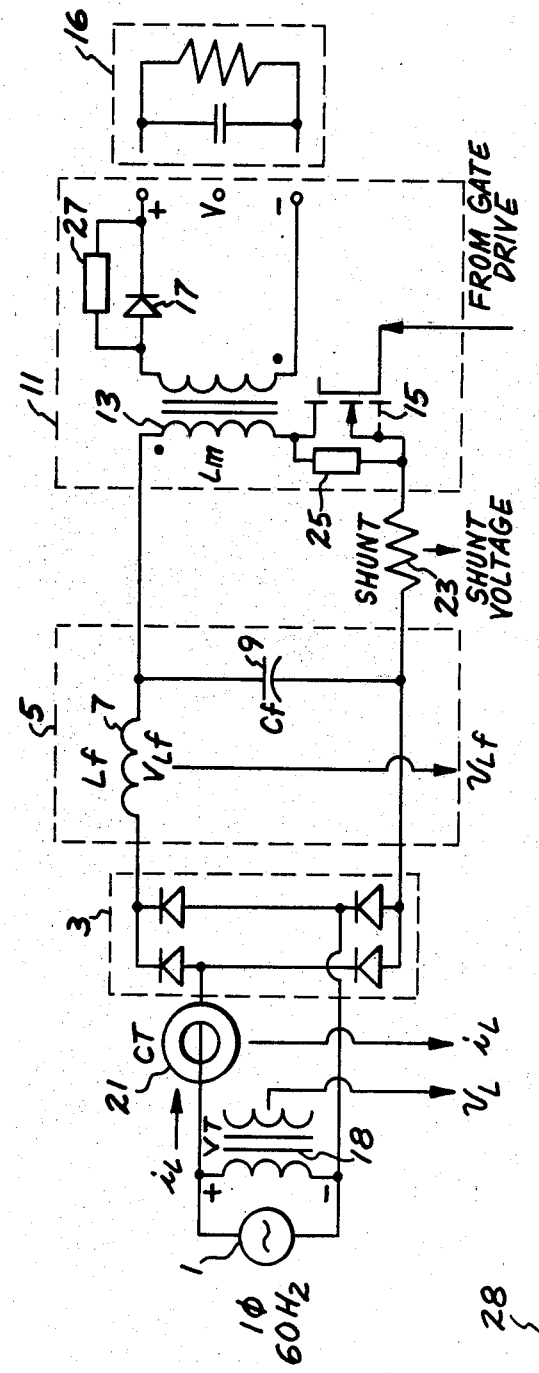
FIG. 1 is a part schematic part block diagram presentation of a single phase AC to DC power converter of the present invention.
Figure 1:
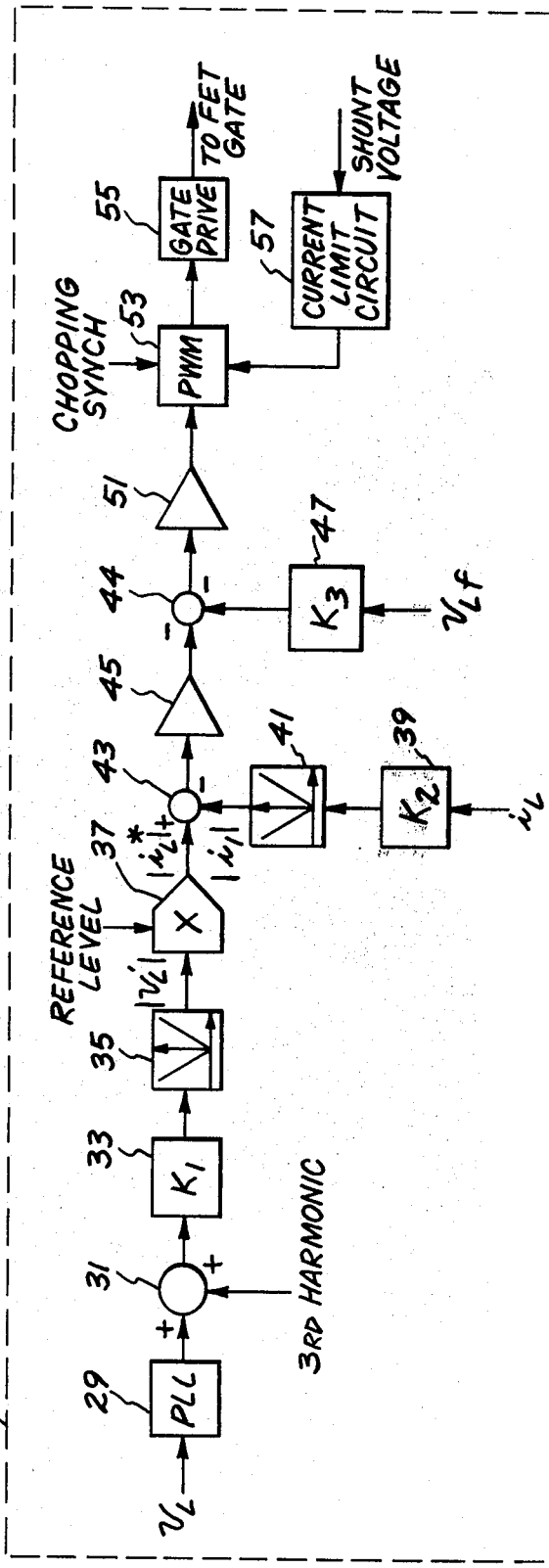

Referring now to the drawing especially to FIG. 1 thereof, a single phase pulse width modulated AC to DC converter suitable for use in the three phase configuration of FIG. 2 is shown. In the single phase AC to DC converter, a single phase voltage source 1 is coupled to a full wave diode bridge 3. The output of the diode bridge is coupled to a high frequency filter 5 which consists of a series inductance 7 with a sense coil wound on the inductor core and a parallel capacitor 9. The sense coil provides a signal $v_{LF}$ proportional to the AC component of the voltage across the inductor. The inductor 7 is connected to the positive output of the full wave bridge. Connected across the capacitor 9 is a DC to DC converter 11 which in the present embodiment is a flyback converter having an input winding of an energy storage transformer 13 in series with a controllable switch which is a MOSFET 15 in the present embodiment. A series combination of the input winding and the MOSFET are connected across capacitor 9. Connected in series with one end of the output winding of transformer 13 is the anode of the diode 17. A load 16 can be connected between the cathode of diode 17 and the other end of the output winding of transformer 13. The input and output windings of transformer 13 have a relative polarity indicated by dots in accordance with the convention that the end of the output winding connected directly to the load and the end of input winding connected to the inductor 7 have the same relative polarities. The voltage transformer 18 has its input connected across the voltage supply 1 and provides a signal $v_L$ at its output terminals. Current transformer 21 is connected to measure the current flowing to the AC to DC converter from the voltage source 1 and provides an output signal $i_L$. A shunt resistor 23 connected in series between the high frequency filter and the DC to DC converter 23 provides a shunt voltage signal proportional to the current flowing through the shunt resistor and to the MOSFET. Snubbers 25 and 27 are connected across the MOSFET and diode 17, respectively, to protect the MOSFET and diode from transient stress during switching intervals.

A control system 28 has an input of signal $v_L$ from voltage transformer 18 which is coupled to a phase lock loop (PLL) 29. The output of the PLL is coupled to a summer 31 where a third harmonic of the fundamental frequency of the supply voltage can be added. The resulting signal is coupled through a gain block 33 to a block 35 where the absolute value of the input is taken. The output of block 35 is coupled to multiplier 37 where the magnitude of the waveform signal is multiplied by a reference level signal. The output of the multiplier is a current waveform command $|i_L|^*$. Signal $i_L$ from current transformer 21 is sent through a gain block 39 to a block 41 where the absolute value of the signal is taken. The output of block 41 is subtracted from the current reference waveform signal in summer 43. The difference is amplified by amplifier 45. A signal $v_{LF}$ proportional to the AC component of the voltage across inductor 7 obtained from the sense coil on inductor 7 is sent through gain block 47 to be subtracted from output of amplifier 45 at summer 44. The output of summer 44 is coupled through amplifier 51 to pulse width modulator (PWM) 53. The pulse width modulator can be implemented, for example, by a Switch Mode Power Supply Control Circuit NE5560 from Signetics, Sunnyvale, Calif. The PWM contains a triangular wave generator such as a saw tooth generator, a comparator, an external synchronization input and a shutdown/soft-start capability. The output of the PWM is connected to a gate drive circuit 55 which in turn is connected to the gate of the MOSFET 15. The shunt voltage from shunt resistor 23 is connected through a current limit circuit 57 to the PWM.

Referring now to FIG. 2, three single phase AC to DC converters 61, 63, and 65 of the type shown in FIG. 1 are connected in a delta configuration with each single phase AC to DC converter having a single phase input. The output of each single phase converter is coupled to the other outputs to provide a single DC output. When the single phase AC to DC converters are used in a three phase configuration each single phase AC to DC converter should be ohmically isolated. In the present embodiment the DC to DC converter of the AC to DC converter provides the ohmic isolation. A signal from one of the voltage transformers of the single phase AC to DC converters is multiplied in multiplier 67 to obtain a third harmonic signal. The same third harmonic signal is added to each of the reference waveforms of the single phase AC to DC converters shown in FIG. 1. A DC voltage control loop 68 provides a reference level signal which adjusts the magnitude of the reference waveform. The reference level signal is generated by subtracting the output voltage $V_o$ from the desired output of the voltage $V_o^*$ in summer 69. The error signal is amplified in amplifier 71 and rectified by half wave rectifier 73. The resulting reference level signal is used for all three single phase AC to DC converters. A synchronization circuit 75 provides a staggered synchronization signal to each of the single phase AC to DC converter PWM's.

The operation of the three phase AC to DC converter will be explained first. Referring to FIG. 2 the three phase AC to DC converter has three single phase converters arranged in delta configuration. The configuration of a single phase AC to DC converter is shown in FIG. 1. The single phase converter has a single phase supply connected to a full wave rectifier. The low pass filter 5 keeps the high frequency switching of the flyback converter which is typically in the 45 kHz range from reaching the single phase supply. The flyback converter operates as follows, when MOSFET 15 conducts, energy is stored in the magnetic field of transformer 13 and it is discharged through diode 17 to the load 16 during the flyback, that is while the MOSFET is off and the diode is forward biased. The duty cycle, which is the ratio of the on time of the MOSFET to the period of the sawtooth reference voltage of the PWM, is varied in response to gating pulses received from the control circuit 28. The control circuit forces the input current waveform to follow the voltage waveform and also maintain a desired output voltage at the load.

The current reference waveform command $|i_L|^*$ is derived from the voltage signal $v_L$ voltage transformer 18 which is proportional to the input voltage. The voltage signal $v_L$ can be used as an input signal to a phase locked loop 29 to produce a pure sinewave or the signal $v_L$ can be used directly. Gain block 33 in the present embodiment has a time independent gain so that the current command has the same wave shape as the input voltage. Gain block 33 could include more complicated signal processing if current waveforms other than sinusoidal are desired. The absolute value of the signal is taken at block 35 and the magnitude of the signal is adjusted dependent upon the difference between the desired output, load voltage $V_o$ and the commanded load voltage $V_o^*$ to produce the current reference waveform command $|i_L|^*$. The current reference command is compared to the absolute value of the line current drawn by the circuit. The resulting error signal is amplified and compared to the voltage $v_{LF}$ which is a measure of the ringing in the filter circuit 5. The high frequency AC signal $v_{LF}$ across capacitor 9 at the resonant frequency of the filter results in an undesirable input to the DC to DC converter. The high frequency AC signal is difficult to measure across capacitor 9 since it is superimposed on a large slowly varying DC signal. Since the same high frequency signal appears across inductor 7, a sense coil mounted on inductor 7 measures the high frequency AC signal $v_{LF}$ directly. The voltage $v_{LF}$ is then used as a feedback signal to dampen the filter circuit oscillations and improve system stability. The difference signal is amplified and converted to a pulse train by PWM 53. The pulse stream is amplified by gate drive block 55 to provide switching power to the MOSFET 15. The current shunt 23 senses MOSFET current and shunt voltage proportional to current is sent to a current limit circuit 57. If the MOSFET current exceeds a predetermined value the PWM shuts down and after a delay the duty cycle of the PWM is reduced when the PWM first restarts.

The response of the control system to changes of reference waveform shape is very rapid allowing the PWM signals to shape current drawn from the supply to closely follow the current reference waveform. Variations of the level of the output voltage from a commanded value is more gradual since the load usually contains a large capacitor. When it is necessary to supply additional power to the load the current reference waveform increases following an increasing envelope varying the input power to force the DC output voltage to the commanded value.

The three single phase AC to DC converters connected in a delta configuration operate independently to shape the single phase currents. A third harmonic of the fundamental frequency of the input waveform is introduced to the current reference waveforms at summer 31 to flatten the peak currents handled by the MOSFETS while still delivering the same average power. Because of the delta connection of the single phase AC to DC converters any balanced triplen harmonics appearing in all three converter phases will cancel and not appear in the input lines of the source. The sawtooth waveform of the pulse width modulator of the three AC to DC converters are staggered in time by means of the synchronization input so that current pulses supplied to the load overlap reducing the amount of filtering required at the load. The sawtooth waveforms can be phase shifted 120° from one another to achieve the desired staggering.

The single phase AC to DC converters can be used alone with a single phase source in which case the operation would be the same as that described above except that the third harmonic signal would not be added to the current reference waveform and chopping synchronization would not be needed.

While the invention has been particularly shown and described with reference to several embodiments thereof, it will be understood by those skilled in the art that various changes in form and details may be made therein without departing from the spirit and scope of the invention.

The invention claimed is:

1. A three phase AC to DC converter supplied from a three phase AC power line and responsive to a desired DC output magnitude command comprising:

three pulse width modulated single phase AC to DC converters having their inputs connected in a delta configuration and connected to said three phase power line, said three pulse width modulated converters providing a single DC output, each of said single phase AC to DC converters comprising pulse width modulating means including means for generating a triangular wave signal, means responsive to a synchronizing signal for staggering said triangular wave in time relative to the triangular waves of the other converters, and means for generating pulse width modulated pulses having a varying duty cycle to said converter, responsive to the desired output magnitude command;

means for generating synchronizing signals coupled to said single phase AC to DC converters to stagger the triangular wave signals of each of said single phase converters in time relative to one another, so that the pulses provided by each of said converters overlap; and means for coupling an external load to said three single phase AC to DC converter output.

2. The three phase AC to DC converter of claim 1 wherein said means for generating synchronizing signals staggers the phase of the carrier wave signals 120° of the carrier wave period relative to one another.

3. The three phase AC to DC converter of claim 1 further comprising:

means for generating a signal proportional to the third harmonic of the fundamental frequency of the line voltage, said third harmonic signal being summed with said modulating current command.

4. The three phase AC to DC converter of claim 3 wherein each said single phase AC to DC converter comprises:

full wave rectifying means having input terminals coupled to one phase of the AC power line and output terminals providing rectified DC;

a DC to DC converter coupled to the output of the full wave rectifying means, said DC to DC converter having controllable switch means;

means for producing a sinusoidal reference waveform signal in phase with the single phase line voltage supplied to said single phase AC to DC converter having means for adjusting the magnitude of said reference waveform signal;

means for providing a waveform signal proportional to the current drawn from said AC to DC power line to said single phase AC to DC converter;

means for comparing said reference waveform and said current waveform signals and generating an error signal proportional to the difference; and means responsive to said error signal for providing pulse width modulated signals to said controllable switch means to reduce said error signal and cause said current waveform to follow said reference waveform.

5. The three phase AC to DC converter of claim 4 wherein said means for adjusting the magnitude of said reference waveform signal is responsive to the difference between a predetermined output voltage and the actual output voltage of said AC to DC converter.

6. The AC to DC converter of claim 5 wherein said DC to DC converter is a flyback converter comprising:

a controllable switch means;

transformer means having an input winding forming a series circuit with said switch means and coupled across said full wave rectifier means;

diode means coupled between the output winding of said transformer and an external load so that when said switch means opens the load receives the energy stored in said transformer while said switch means was closed.

7. The AC to DC converter of claim 4 wherein said switching means is a power MOSFET.

8. A three phase AC to DC converter supplied from a three phase AC power line and responsive to a desired DC output magnitude command comprising;

means for generating a signal proportional to the third harmonic of the fundamental frequency of the line voltage;

three pulse width modulated single phase AC to DC converters having their inputs connected in a delta configuration and connected to said three phase power line, said three pulse width modulated converters providing a single DC output, each of said single phase AC to DC converters comprising pulse width modulating means including means for generating a triangular wave signal, and means for generating pulse width modulated pulses having a varying duty cycle to said converter responsive to the desired DC output magnitude command and the third harmonic signal, so that the third harmonic component reduces the peaks of current in each of said single phase AC to DC converters, and means for coupling an external load to said three single phase AC to DC converter output.

9. An AC to DC converter supplied from an AC power line comprising:

full wave rectifying means having input terminals coupled to said DC power line an output terminal providing rectified DC;

a DC to DC converter coupled to the output of the full wave rectifier means, said DC to DC converter having a controllable switch means;

filter means coupled between the output of said full wave rectifier and input of said DC to DC converter for blocking switching frequencies generated by said controllable switch means from reaching said AC power line;

means for detecting a ringing of said filter means and developing a signal proportional to the ringing;

means for coupling an external load to the output of said dc to dc converter;

means for producing a reference sinusoidal waveform signal in phase with said input line voltage having means for adjusting the magnitude of said reference waveform signal;

means for providing a waveform signal proportional to the current drawn from said AC power line by said AC to DC converter;

means for comparing said reference waveform and current waveform signals and generating an error signal proportional to the difference;

means for subtracting said signal proportional to the ringing from said error signal to dampen said filter ringing; and means responsive to said error signal for providing pulse width modulated signals to said controlling switch means to reduce said error signal and cause said current waveform to follow said reference waveform.

10. The AC to DC converter of claim 9 wherein said switching means is a power MOSFET.

11. The AC to DC converter of claim 9 wherein said filter means comprises a series inductor and a parallel capacitor.

12. The AC to DC converter of claim 11 wherein said means for detecting a ringing of said filter means comprises a sense coil mounted on said inductor to detect the AC component across said inductor.

* * * * *